(12) United States Patent
Van Der Eem et al.

(10) Patent No.: US 10,408,575 B2
(45) Date of Patent: Sep. 10, 2019

(54) BALLISTIC RESISTANT ARTICLES COMPRISING TAPES

(71) Applicant: TEIJIN ARAMID B.V., Arnhem (NL)

(72) Inventors: Joris Van Der Eem, Arnhem (NL); Jules Harings, Heerlen (NL); Gerardus Janse, Maasbracht (NL); Hendrik Tjaden, Deventer (NL)

(73) Assignee: TEIJIN ARAMID B.V., Arnhem (NL)

( * ) Notice: Subject to any disclaimer, the term of this patent is extended or adjusted under 35 U.S.C. 154(b) by 0 days.

(21) Appl. No.: 15/113,869

(22) PCT Filed: Feb. 5, 2015

(86) PCT No.: PCT/EP2015/052362
§ 371 (c)(1),
(2) Date: Jul. 25, 2016

(87) PCT Pub. No.: WO2015/118043
PCT Pub. Date: Aug. 13, 2015

(65) Prior Publication Data
US 2017/0010071 A1  Jan. 12, 2017

(30) Foreign Application Priority Data
Feb. 10, 2014 (EP) .................................. 14154460

(51) Int. Cl.
*F41H 5/04* (2006.01)
*B32B 27/06* (2006.01)

(52) U.S. Cl.
CPC ........... *F41H 5/0478* (2013.01); *B32B 27/06* (2013.01); *F41H 5/0471* (2013.01); *F41H 5/0485* (2013.01); *B32B 2323/043* (2013.01); *B32B 2571/02* (2013.01)

(58) Field of Classification Search
CPC ......... B32B 27/02; B32B 27/06; B32B 27/08; B32B 27/12; B32B 2323/04; B32B 2323/043; B32B 2571/00; B32B 2571/02; F41H 5/04; F41H 5/0471; F41H 5/0478; F41H 5/0485
USPC ....................................................... 89/36.02
See application file for complete search history.

(56) References Cited

U.S. PATENT DOCUMENTS

| 4,944,974 | A | * | 7/1990 | Zachariades | A61L 27/507 428/36.1 |
| 4,953,234 | A | * | 9/1990 | Li | A42B 3/06 2/2.5 |
| 5,340,633 | A | * | 8/1994 | van der Loo | F41H 5/0414 2/2.5 |
| 5,935,678 | A | * | 8/1999 | Park | A41D 31/005 2/2.5 |
| 6,183,834 | B1 | * | 2/2001 | van der Loo | B29C 70/30 264/241 |
| 6,265,504 | B1 | * | 7/2001 | Liu | C08F 110/02 502/117 |
| 7,964,261 | B2 | * | 6/2011 | Backer | B32B 5/12 139/383 R |
| 7,993,715 | B2 | * | 8/2011 | Geva | B32B 5/12 2/2.5 |
| 8,197,935 | B2 | * | 6/2012 | Bovenschen | F41H 5/0485 428/212 |
| 2004/0081815 | A1 | * | 4/2004 | Baudonnel | B29C 70/226 428/292.1 |
| 2006/0142521 | A1 | | 6/2006 | Rastogi et al. | |
| 2011/0020593 | A1 | * | 1/2011 | Winkler | F41H 5/0485 428/105 |
| 2011/0095447 | A1 | * | 4/2011 | Peters | B29C 43/003 264/119 |
| 2012/0152099 | A1 | | 6/2012 | Wilenski et al. | |

FOREIGN PATENT DOCUMENTS

| EP | 2 047 975 A1 | 4/2009 |
| WO | 01/21668 A1 | 3/2001 |
| WO | 2009/109632 A1 | 9/2009 |
| WO | 2009/141276 A1 | 11/2009 |
| WO | 2009/153318 A1 | 12/2009 |
| WO | 2010/079172 A1 | 7/2010 |

OTHER PUBLICATIONS

Rastogi et al.; "Heterogeneity in Polymer Melts from Melting of Polymer Crystals;" Nature Materials; Aug. 1, 2005; pp. 635-641; vol. 4, No. 8.
Lippits; "Controlling the melting kinetics of polymers; a route to a new melt state;" PhD Thesis; Eindhoven University of Technology; Mar. 6, 2007.
Mar. 9, 2015 International Search Report issued International Patent Application No. PCT/EP2015/052362.
Mar. 9, 2015 Written Opinion of the International Searching Authority issued in International Patent Application No. PCT/EP2015/052362.

* cited by examiner

*Primary Examiner* — Stephen Johnson
*Assistant Examiner* — Benjamin S Gomberg
(74) *Attorney, Agent, or Firm* — Oliff PLC

(57) ABSTRACT

A ballistic-resistant molded article includes a compressed stack of sheets made up of reinforcing tapes having a tensile strength of at least 1.0 GPa, a tensile modulus of at least 40 GPa, and a tensile energy-to-break of at least 15 J/g, the direction of the tapes within the compressed stack being not unidirectional. The stack includes a first layer of sheets including reinforcing tapes and a high-density polyethylene (HDPE) as matrix material and a further layer of sheets including reinforcing tapes and a thermoplastic elastomer as matrix material, wherein the further layer includes 0.2-8 wt. % matrix material.

11 Claims, No Drawings

BALLISTIC RESISTANT ARTICLES COMPRISING TAPES

The present application is a U.S. national stage application of PCT/EP2015/052362, incorporated herein by reference in its entirety.

BACKGROUND

The present disclosure pertains to ballistic resistant articles comprising tapes, and to a method for manufacturing thereof.

Ballistic resistant articles comprising tapes are known in the art.

WO2009/109632 describes a ballistic resistant moulded article comprising a compressed stack of sheets comprising reinforcing tapes and an organic matrix material, the direction of the tapes within the compressed stack being not unidirectionally, wherein the tapes have a width of at least 2 mm and a width to thickness ratio of at least 10:1 with the stack comprising 0.2-8 wt. % of an organic matrix material.

While the reference mentioned above describes ballistic-resistant materials with adequate properties, there is still room for improvement. More in particular, there is need for a light-weight ballistic resistant article which combines a high ballistic performance with good construction stability, in particular well-controlled deformation properties upon impact. The present disclosure provides such an article.

SUMMARY

The present disclosure pertains to a ballistic-resistant moulded article comprising a compressed stack of sheets comprising reinforcing tapes having a tensile strength of at least 1.0 GPa, a tensile modulus of at least 40 GPa, and a tensile energy-to-break of at least 15 J/g, the direction of the tapes within the compressed stack being not unidirectional, wherein the stack comprises a first layer comprising sheets comprising reinforcing tapes and a high-density polyethylene (HDPE) as matrix material and a further layer comprising sheets comprising reinforcing tapes and a thermoplastic elastomer as matrix material, wherein the further layer comprises 0.2-8 wt. % matrix material.

DETAILED DESCRIPTION

It has been found that the combination of a layer comprising HDPE as matrix with a layer comprising a thermoplastic elastomer as matrix results in an article which combines high impact resistance with improved constructional integrity of the article and reduced dynamic and static back face deformation upon impact. In particular at extreme temperatures, e.g., −50° C. or +70° C. or +90° C., the structural integrity of the article according to the disclosure is better than that of an article comprising only thermoplastic elastomer as matrix. Additionally, as compared to a system comprising only thermoplastic elastomer as matrix, the system according to the disclosure shows improved peel resistance and improved processing properties, in particular being easier to drill or cut.

As compared to a system comprising only HDPE as matrix, the article according to the disclosure performs better at equal weight against high-powered rifle ammunition, such as NATO-ball, in terms of V50.

It is noted that WO2009/141276 describes an antiballistic laminate based on polymer tapes which are preferably connected through an adhesive. This document mentions among other possibilities HDPE and thermoplastic elastomers as matrix. However, it does not disclose or suggest a system comprising a layer with one type of matrix in combination with a layer with another type of matrix, let alone the article according to the disclosure where the type of matrix in the various layers, and for the thermoplastic elastomer also the amount of matrix, are specifically defined. The same goes for EP2047975, which describes a stack comprising at least one layer of tapes and at least one layer of multifilament yarn. Among others, HDPE and thermoplastic elastomers are mentioned as matrix, but the specific article according to the disclosure is not disclosed or suggested.

The article according to the disclosure comprises two layers with different types of matrix materials.

The first layer comprises sheets comprising reinforcing tapes and a high-density polyethylene (HDPE) as matrix. This layer will further also be indicated as the HDPE-based layer. The matrix content of this layer can vary between 0.2 and 20 wt. %. For this layer, the optimum matrix content is determined on the one hand by the amount of HDPE required to provide the improved delamination properties. On the other hand, the amount of matrix should not be more than is required to obtain this effect, as excess matrix does not contribute substantially to the ballistic properties of the panel. It may be preferred for the amount of matrix material in this layer to be in the range of 0.2 to 15 wt. %, more in particular in the range of 0.2-10 wt. %, still more in particular in the range of 0.2 to 4 wt. %. The HDPE used in the HDPE-based layer generally has a density in the range of 0.930 to 0.970 g/cm$^3$, determined in accordance with ASTM D792.

The HDPE generally has a molecular weight Mw in the range of $1·10^4$ to $1·10^8$ g/mol, in particular $1·10^5$ to $1·10^7$ g/mol.

The HDPE matrix used in the present disclosure is an isotropic material and can therewith be distinguished from the elongate bodies, which are anisotropic, in that in the elongate bodies the polymer is oriented in the direction of the elongate body.

This can be seen, e.g., from the ratio between the strength of the material in a first direction and the strength of the material in a direction perpendicular thereto. For the matrix, which is an isotropic material, the ratio between the strength of the material determined in the direction where its strength is highest (machine direction) and the strength in the direction perpendicular thereto is generally at most 5:1. In contrast, for the elongate bodies, the ratio between the strength of the material determined in the direction where it strength is highest (machine direction) and the strength in the direction perpendicular thereto is generally at least 50:1. This parameter can, e.g., be determined from the breaking tenacity as determined in accordance with ASTM-D 7744-11.

It is noted that it is possible for the HDPE-based layer to also encompass other types of matrix material. Within the context of the present specification, a layer will be indicated as a HDPE-based layer if of the matrix present in this layer at least 60 wt. % is HDPE. For reasons of efficiency of manufacture and effect to be obtained, it is preferred for the matrix present in the HDPE-based layer to comprise at least 70 wt. % HDPE, preferably at least 80 wt. %, more preferably at least 90 wt. %.

The further layer comprises sheets comprising reinforcing tapes and a thermoplastic elastomer as matrix. This layer will further also be indicated as the elastomer-based layer.

For this layer, the matrix content is between 0.2 and 8 wt. %, calculated on the total of tapes and organic matrix material. The use of more than 8 wt. % of matrix material leads to a decrease of the ballistic performance of the article at the same areal weight. On the other hand, it was found that if no matrix material is used at all in this layer, the delamination properties of the article will be unacceptable. It may be preferred for the thermoplastic elastomer matrix material to be present in an amount of at least 1 wt. %, more in particular in an amount of at least 2 wt. %, in some instances at least 2.5 wt. %. In some embodiments it may be preferred for the matrix material to be present in an amount of at most 7 wt. %, sometimes at most 6.5 wt. %.

Thermoplastic elastomers (TPE), sometimes referred to as thermoplastic rubbers, which are used as matrix in a first layer of the article according to the disclosure, are a class of copolymers or a physical mix of polymers (usually a plastic and a rubber) which comprises materials with both thermoplastic and elastomeric properties, i.e., it shows plastic flow above its Tg (glass transition temperature), Tm (melting point), or Ts (softening point) (thermoplastic behavior) and shows resilient properties below the softening point. In one embodiment, the material has an elongation at break of at least 100%, in particular at least 200%. The upper limit is not critical to the present disclosure. A value of 600% may be mentioned in general. Preferably the elongation at break of the elastomer is higher than the elongation at break of the fiber or tape that may be manufactured from the composition of the present disclosure, as will be discussed in more detail below. In one embodiment, the thermoplastic elastomer has a tensile modulus (at 25° C.) of at most 40 MPa (ASTM D7744-11).

Suitable thermoplastic elastomers include polyurethanes, polyvinyls, polyacrylates, block copolymers and mixtures thereof. In one embodiment, the thermoplastic elastomer is a block copolymer of styrene and an alpha-olefin comonomer. Suitable comonomers include C4-C12 alpha-olefins such as ethylene, propylene, and butadiene. The use of polystyrene-polybutadiene-polystyrene polymer or polystyrene-isoprene-polystyrene is considered preferred at this point in time. These kind of polymers are commercially available, e.g., under the trade name Kraton or Styroflex.

It is understood that thermoplastic elastomer and the HDPE as described herein are not the same polymer. In particular, the HDPE does not have the characteristic properties of the thermoplastic elastomer, and the other way around. HDPE does not generally behave as thermoplastic elastomers, even if it contains small amounts of other monomers or polymers.

It is noted that it is possible for the elastomer-based layer to also encompass other types of matrix material. Within the context of the present specification a layer will be indicated as an elastomer-based layer if of the matrix present in this layer at least 60 wt. % is elastomer. For reasons of efficiency of manufacture and effect to be obtained, it is preferred for the matrix present in the elastomer-based layer to comprise at least 70 wt. % thermoplastic elastomer, preferably at least 80 wt. %, more preferably at least 90 wt. %. Of course, a single type of elastomer or combinations of different elastomers may be used.

Both the HDPE-based layer and the elastomer-based layer comprise sheets comprising reinforcing tapes and a matrix. Within the present specification, the term sheet refers to an individual sheet comprising tapes, which sheet can individually be combined with other corresponding sheets. The sheet may or may not comprise a matrix material, as will be elucidated below.

In one embodiment of the present disclosure, matrix material is provided within the sheets themselves, where it serves to adhere the tapes to each other.

In another embodiment of the present disclosure, matrix material is provided on the sheet, where it acts as a glue or binder to adhere the sheet to further sheets within the stacks. Obviously, the combination of these two embodiments is also envisaged.

In one embodiment of the present disclosure, the sheets themselves contain reinforcing tapes and a matrix material. Sheets of this type may, for example, be manufactured as follows. In a first step, the tapes are provided in a layer, and then a matrix material is provided onto the layer under such conditions that the matrix material causes the tapes to adhere together. This embodiment is particularly attractive where the matrix material is in the form of a film. In one embodiment, the tapes are provided in a parallel arrangement.

Sheets of this type may, for a further example, also be manufactured by a process in which a layer of tapes is provided, a layer of a matrix material is applied onto the tapes, and a further layer of tapes is applied on top of the matrix. In one embodiment, the first layer of tapes encompasses tapes arranged in parallel and the second layer of tapes are arranged parallel to the tapes in the first layer but offset thereto. In another embodiment, the first layer of tapes is arranged in parallel, and the second layer of tapes is arranged crosswise on the first layer of tapes.

In one embodiment, the provision of the matrix material is effected by applying one or more films of matrix material to the surface, bottom or both sides of the plane of tapes and then causing the films to adhere to the tapes, e.g., by passing the films together with the tapes, through one or more heated pressure rolls.

In one embodiment of the present disclosure, the tape layer is provided with an amount of a liquid substance containing the matrix material. The advantage of this is that more rapid and better surface coating or wetting of the tapes is achieved. The liquid substance may be, for example, a solution, a dispersion or a melt of the matrix material. If a solution or a dispersion of the matrix material is used in the manufacture of the sheet, the process also comprises evaporating the solvent or dispersant. This can for instance be accomplished by using an organic matrix material of very low viscosity in wetting the tape surfaces in the manufacture of the sheet. If so desired, the matrix material may be applied at a reduced pressure (vacuum).

In one embodiment, the matrix material is applied in the form of a powder, which is adhered to the sheets by heat or pressure, or a combination of both.

In the case that the sheet itself does not contain a matrix material, the sheet may be manufactured by the steps of providing a layer of tapes and where necessary adhering the tapes together by the application of heat and pressure. In one embodiment of this disclosure, the tapes overlap each other at least partially, and are then compressed to adhere to each other.

Another embodiment wherein the sheets may be free of matrix are when the sheets are manufactured by weaving tapes, either with other tapes, or with bonding thread.

The matrix material will then be applied onto the sheets to adhere the sheets to each other during the manufacture of the ballistic material. The matrix material can be applied in the form of a film or in the form of a liquid material, as discussed above for the application onto the tapes themselves. It is also possible to apply the matrix in the form of a powder.

In one embodiment of the present disclosure, the matrix material is applied in the form of a web, wherein a web is a discontinuous polymer film, that is, a polymer film with holes. This allows the provision of low weights of matrix materials. Webs can be applied during the manufacture of the sheets, but also between the sheets.

In another embodiment of the present disclosure, the matrix material is applied in the form of strips, yarns, powder, pellets, or fibres of polymer material, the latter for example in the form of a woven or non-woven yarn of fibre web or other polymeric fibrous weft. Again, this allows the provision of low weights of matrix materials. Strips, yarns, powder, pellets or fibres can be applied during the manufacture of the sheets, but also between the sheets.

In a further embodiment of the present disclosure, the matrix material is applied in the form of a liquid material, as described above, where the liquid material may be applied homogeneously over the entire surface of the elongate body plane, or of the sheet, as the case may be. However, it is also possible to apply the matrix material in the form of a liquid material inhomogeneously over the surface of the elongate body plane, or of the sheet, as the case may be. For example, the liquid material may be applied in the form of dots or stripes, or in any other suitable pattern.

In various embodiments described above, the matrix material is distributed inhomogeneously over the sheets. In one embodiment of the present disclosure, the matrix material is distributed inhomogeneously within the compressed stack. In this embodiment more matrix material may be provided where the compressed stack encounters the most influences from outside which may detrimentally affect stack properties.

The ballistic-resistant moulded article according to the disclosure comprises a HDPE-based layer and an elastomer-based layer. The article according to the disclosure may comprise more than one HDPE-based layer and/or more than one elastomer-based layer.

In one embodiment, the moulded article comprises a HDPE-based layer at or near the back face of the article, wherein the back face is the face opposite the strike face, which is the side from which impact is expected. It has been found that the presence of the HDPE-based layer at or near the back face of the article helps to prevent delamination and fragmentation of the article. Further the retention of internal structure is maintained.

In the context of the present specification, "at the back face" means that the lowest point of the layer at issue is within 5%, determined over the cross-section of the article, from the bottom of the article in question, preferably within 3%, in particular at 0% (thus at the outer side of the article, not counting layers not comprising reinforcing tapes and matrix, e.g., cover layers). In the context of the present specification, "near the back face" means that the lowest point of the layer at issue is between 5 and 20%, determined over the cross-section of the article, from the bottom of the article in question.

In one embodiment the moulded article comprises a HDPE-based layer at or near the back face of the article, in particular at the back face of the article, specifically when the article is a helmet. It has been found that in particular for helmets the effect of preventing delamination and deformation upon impact by the presence of a HDPE layer at this location is pronounced.

In another embodiment, the moulded article comprises a HDPE-based layer at or near the strike face of the article. It has been found that this embodiment is particularly attractive where the article is a ballistic panel used behind a ceramic or metal impact shield (also indicated as a strike face).

In the context of the present specification, "at the strike face" means that the highest point of the layer at issue is within 5% from the front of the article in question, determined over the cross-section of the article, preferably within 3%, in particular at 0% (thus at the outer side of the article, not counting layers not comprising reinforcing tapes and matrix, e.g., cover layers).

In the context of the present specification, "near the strike face" means that the highest point of the layer at issue is between 5 and 20% from the front of the article in question, determined over the cross-section of the article.

In a further embodiment, the article comprises a HDPE-based layer at or near the strike face of the article, and a HDPE-based layer at or near the back face of the article. In this embodiment, an elastomer-based layer will be present between the HDPE-based layers. This may be attractive for embodiments where a reduction of back face deformation is to be combined with the possibility of connecting objects to the strike face or back face of the panel. In one embodiment, the article with this structure is a helmet. Ballistic resistant helmets designed for the modern warrior have multiple add-on capabilities for example cameras, light, camouflage shroud, additional protection plates, and such. Typically these items are connected to the helmet via bolts, which partly or fully perforate the helmet shell and are regarded as weak points of ballistic helmets. With the use of HDPE at the surface, some or all of the added systems can be glued to the surface, reducing the number of weak points.

In a further embodiment, the article comprises an elastomer-based layer at or near the strike face of the article, and an elastomer-based layer at or near the back face of the article. In one embodiment, the article with this structure is a helmet. In this embodiment, a HDPE-based layer will be present between the elastomer-based layers. This embodiment may be attractive where a system with a very high stiffness is desired.

As will be evident to the skilled person, systems with more than three layers, e.g., 4, 5, 6, or even more can also be manufactured if so desired.

The ballistic resistant moulded article according to the disclosure may be flat, single-curved, double curved, or multicurved. Examples include panels, shields, and helmets. Use of the present disclosure in helmets is particularly preferred.

In one embodiment, the ballistic resistant moulded article according to the disclosure is a helmet which meets the requirements of class II-a of the NIJ Standard—0106.01. In a preferred embodiment, the requirements of class II of the said Standard are met, in an even more preferred embodiment the requirements as specified by the US Army for the type Advanced Combat Helmet or Enhanced Combat Helmet. This ballistic performance is preferably accompanied by a low areal weight, in particular a mass per area of at most 20 kg/m$^2$, more in particular at most 15 kg/m$^2$, even more in particular at most 11 kg/m$^2$. In some embodiments, the areal weight of the helmet may be as low as 5 kg/m$^2$ for example for the Ultra Light Advanced Combat Helmet. The minimum areal weight of the stack is given by the minimum ballistic resistance required.

In one embodiment, the ballistic resistant moulded article according to the disclosure is a shield which meets the requirements of class II of the NIJ Standard—0101.04 P-BFS performance test. In a preferred embodiment, the requirements of class IIIa of said Standard are met, in an even more preferred embodiment, the requirements of class III are met, or the requirements of even higher classes.

This ballistic performance is preferably accompanied by a low areal weight. Suitable articles can be made presenting protection against class III threats having an areal weight of at most 35 kg/m$^2$, more in particular at most 19 kg/m$^2$, still more in particular at most 16 kg/m$^2$. In some embodiments, the areal weight of the stack may be as low as 15 kg/m$^2$ or less, in particular as low as 10 kg/m$^2$ or less, or even as low as 8 kg/m$^2$ or less. The minimum areal weight of the stack is given by the minimum ballistic resistance required.

The shield according to this embodiment of the disclosure preferably has a peel strength of at least 5 N, more in particular at least 5.5 N, determined in accordance with ASTM-D 1876-00, except that a head speed of 100 mm/minute is used.

Within the context of the present specification layers are parallel to the main (i.e., largest) outer surface of the article. It is preferred for the various layers of the article to extend along substantially the entire article, as this is believed to provide the best possible properties. It is of course possible that, e.g., at the edges of the article one or more of the layers are not present but it is preferred that both a HDPE based-layer and an elastomer-based layer are present over at least 75%, preferably at least 85%, more preferably at least 90% of the panel, determined from a top or bottom perspective.

The composition of the article can vary within wide ranges, depending on the required properties of the resulting article. In one embodiment, the article comprises 2-70 wt. % of HDPE-based layer(s), calculated on the total weight of matrix and reinforcing tapes in the article. In one embodiment, the article comprises 5-50 wt. % of HDPE-based layers, in particular 7-20 wt. %.

In one embodiment, the article comprises 30-98 wt. % of elastomer-based layer(s), calculated on the total weight of matrix and reinforcing tapes in the article. In one embodiment, the article comprises 50-95 wt. % of elastomer-based layers, in particular 80-93 wt. %.

Layers comprising reinforcing tapes and other matrix materials may be present, but their optional presence does not detract from the preference for the ranges given above. In one embodiment, the HDPE-based layer(s) and elastomer-based layer(s) build up at least 70 wt % of the article, preferably at least 80 wt %, more preferably at least 90 wt % (percentages calculated on layers comprising reinforcing tapes).

Depending on the final use and on the thickness of the individual sheets, the number of sheets in the stack in the ballistic resistant article according to the disclosure is generally at least 2, in particular at least 4, more in particular at least 8. The number of sheets is generally at most 500, in particular at most 400.

In the present disclosure the direction of tapes within the compressed stack is not unidirectional. This means that in the stack as a whole, tapes are oriented in different directions.

In one embodiment of the present disclosure the tapes in a sheet are unidirectionally oriented, and the direction of the tapes in a sheet is rotated with respect to the direction of the tapes of other sheets in the stack, more in particular with respect to the direction of the tapes in adjacent sheets. Good results are achieved when the total rotation within the stack amounts to at least 45 degrees. Preferably, the total rotation within the stack amounts to approximately 90 degrees. In one embodiment of the present disclosure, the stack comprises adjacent sheets wherein the direction of the tapes in one sheet is perpendicular to the direction of tapes in adjacent sheets.

The ballistic-resistant moulded article may be manufactured by methods used in the art, e.g., as described in WO2009/109632. Suitable methods include the manufacture of sheets, stacking the sheets in such a manner that the direction of the tapes within the compressed stack is not unidirectional, and compressing the stack, wherein it is ensured during manufacture that the layer structure and matrix content of the article are obtained. For this, reference is made to what has been stated above. Compressing can be done under pressure, e.g., of at least 0.5 MPa. Compression can also be performed under vacuum.

Where necessary, the temperature during compression is selected such that the matrix material is brought above its softening or melting point, if this is necessary to cause the matrix to help adhere the tapes and/or sheets to each other. Compression at an elevated temperature is intended to mean that the moulded article is subjected to the given pressure for a particular compression time at a compression temperature above the softening or melting point of the organic matrix material and below the softening or melting point of the tapes.

The required compression time and compression temperature depend on the nature of the tape and matrix material and on the thickness of the moulded article and can be readily determined by the person skilled in the art.

Where the compression is carried out at elevated temperature, it may be preferred for the cooling of the compressed material to also take place under pressure. Cooling under pressure is intended to mean that the given minimum pressure is maintained during cooling at least until so low a temperature is reached that the structure of the moulded article can no longer relax under atmospheric pressure. It is within the scope of the skilled person to determine this temperature on a case by case basis. Where applicable it is preferred for cooling at the given minimum pressure to be down to a temperature at which the organic matrix material has largely or completely hardened or crystallized and below the relaxation temperature of the reinforcing tapes. The pressure during the cooling does not need to be equal to the pressure at the high temperature. During cooling, the pressure should be monitored so that appropriate pressure values are maintained, to compensate for decrease in pressure caused by shrinking of the moulded article and the press.

In the process of the disclosure the stack may be made starting from loose sheets. Loose sheets are difficult to handle, however, in that they easily tear in the direction of the tapes. It is therefore preferred to make the stack from consolidated sheet packages containing from 2 to 8, as a rule 2, 4 or 8. For the orientation of the sheets within the sheet packages, reference is made to what has been stated above for the orientation of the sheets within the compressed stack. Consolidated is intended to mean that the sheets are firmly attached to one another. Very good results are achieved if the sheet packages, too, are compressed. The sheets may be consolidated by the application of heat and/or pressure, as is known in the art.

The tapes used in the present disclosure may have the length larger than the width and the thickness, while the width is in turn larger than the thickness. In the tapes used in the present disclosure, the ratio between the width and the thickness is more than 10:1, in particular more than 20:1, more in particular more than 50:1, still more in particular more than 100:1. The maximum ratio between the width and the thickness is not critical to the present disclosure. It generally is at most 1000:1, depending on the tape width.

The width of the tape used in the present disclosure is at least 2 mm, in particular at least 10 mm, more in particular at least 20 mm. The width of the tape is not critical and may generally be at most 500 mm. The thickness of the tape is generally at least 8 microns, in particular at least 10 microns. The thickness of the tape is generally at most 150 microns, more in particular at most 100 microns.

The ratio between the length and the width of the tapes used in the present disclosure is not critical. It depends on the width of the tape and the size of the ballistic resistant moulded article. The ratio between length and width is at least 1. As a general value, a maximum length to width ratio of 1 000 000 may be mentioned.

Any natural or synthetic tapes may in principle be used in the present specification. Use may be made of for instance tapes made of metal, semimetal, inorganic materials, organic materials or combinations thereof. For application of the tapes in ballistic-resistant moulded articles it is essential that the tapes bodies be ballistically effective, which, more specifically, requires that they have a high tensile strength, a high tensile modulus and a high energy absorption, reflected in a high energy-to-break. The tapes used in the present disclosure have a tensile strength of at least 1.0 GPa, a tensile modulus of at least 40 GPa, and a tensile energy-to-break of at least 15 J/g.

Suitable inorganic tapes having a high tensile strength are for example carbon fibre tapes, glass fibre tapes, and ceramic fibre tapes. Suitable organic tapes having a high tensile strength are for example tapes made of aramid, of liquid crystalline polymer, and of highly oriented polymers such as polyolefins, polyvinylalcohol, and polyacrylonitrile.

In the present disclosure the use of homopolymers and copolymers of polyethylene and polypropylene is preferred. These polyolefins may contain small amounts of one or more other polymers, in particular other alkene-1-polymers.

It is preferred for the tapes used in the present disclosure sheet to be high-drawn tapes of high-molecular weight linear polyethylene. High molecular weight here means a weight average molecular weight of at least 400 000 g/mol. Linear polyethylene here means polyethylene having fewer than 1 side chain per 100 C atoms, preferably fewer than 1 side chain per 300 C atoms. The polyethylene may also contain up to 5 mol % of one or more other alkenes which are copolymerisable therewith, such as propylene, butene, pentene, 4-methylpentene, octene.

It may be particularly preferred to use tapes of ultra-high molecular weight polyethylene (UHMWPE), that is, polyethylene with a weight average molecular weight of at least 500 000 g/mol. The use of tapes with a molecular weight of at least $1*10^6$ g/mol may be particularly preferred. The maximum molecular weight of the UHMWPE tapes suitable for use in the present disclosure is not critical. As a general value a maximum value of $1*10^8$ g/mol may be mentioned. The molecular weight distribution and molecular weight averages (Mw, Mn, Mz) can be determined as described in WO2009/109632.

In one embodiment, the tensile strength of the tapes is at least 1.2 GPa, more in particular at least 1.5 GPa, still more in particular at least 1.8 GPa, even more in particular at least 2.0 GPa. In one embodiment, the tensile strength of these tapes is at least 2.0 GPa, in particular at least 2.5 GPa, more in particular at least 3.0 GPa, still more in particular at least 4 GPa. Tensile strength is determined in accordance with ASTM D7744-11.

In one embodiment, the tapes have a tensile modulus of at least 50 GPa. More in particular, the tapes may have a tensile modulus of at least 80 GPa, more in particular at least 100 GPa, still more in particular at least 120 GPa, even more in particular at least 140 GPa, or at least 150 GPa. The modulus is determined in accordance with ASTM D7744-11.

In one embodiment, the tapes have a tensile energy to break of at least 20 J/g, in particular at least 25 J/g. In another embodiment, the tapes have a tensile energy to break of at least 30 J/g, in particular at least 35 J/g, more in particular at least 40 J/g, still more in particular at least 50 J/g. The tensile energy to break is determined in accordance with ASTM D7744-11. It is calculated by integrating the energy per unit mass under the stress-strain curve.

In one embodiment, the polyethylene tapes used in the present disclosure have a high molecular orientation as is evidenced by their XRD diffraction pattern.

In one embodiment of the present disclosure, the tapes have a 200/110 uniplanar orientation parameter Φ of at least 3. The 200/110 uniplanar orientation parameter Φ is defined as the ratio between the 200 and the 110 peak areas in the X-ray diffraction (XRD) pattern of the tape sample as determined in reflection geometry. The 200/110 uniplanar orientation parameter gives information about the extent of orientation of the 200 and 110 crystal planes with respect to the tape surface. For a tape sample with a high 200/110 uniplanar orientation the 200 crystal planes are highly oriented parallel to the tape surface. It has been found that a high uniplanar orientation is generally accompanied by a high modulus, high tensile strength and high tensile energy to break. The ratio between the 200 and 110 peak areas for a specimen with randomly oriented crystallites is around 0.4. However, in the tapes that are preferentially used in one embodiment of the present disclosure the crystallites with indices 200 are preferentially oriented parallel to the film surface, resulting in a higher value of the 200/110 peak area ratio and therefore in a higher value of the uniplanar orientation parameter. This parameter can be determined as described in WO2009/109632.

The UHMWPE tapes used in one embodiment of the ballistic material according to the disclosure have a 200/110 uniplanar orientation parameter of at least 3. It may be preferred for this value to be at least 4, more in particular at least 5, or at least 7. Higher values, such as values of at least 10 or even at least 15 may be particularly preferred. The theoretical maximum value for this parameter is infinite if the peak area 110 equals zero. High values for the 200/110 uniplanar orientation parameter are often accompanied by high values for the strength and the energy to break.

In one embodiment, the UHMWPE tapes used in the present disclosure have a narrow molecular weight distribution have an Mw/Mn ratio of at most 6. More in particular the Mw/Mn ratio is at most 5, still more in particular at most 4, even more in particular at most 3. The use of materials with an Mw/Mn ratio of at most 2.5, or even at most 2 is envisaged in particular.

In one embodiment of the present disclosure, the UHMWPE tapes, in particular UHMWPE tapes have a DSC crystallinity of at least 74%, more in particular at least 80%. The DSC crystallinity can be determined as described in WO2009/109632.

The polyethylene used in this embodiment of the present disclosure can be a homopolymer of ethylene or a copolymer of ethylene with a co-monomer which is another alpha-olefin or a cyclic olefin, both with generally between 3 and 20 carbon atoms. Examples include propene, 1-butene, 1-pentene, 1-hexene, 1-heptene, 1-octene, cyclohexene, etc. The use of dienes with up to 20 carbon atoms is also possible, e.g., butadiene or 1-4 hexadiene. The amount of non-ethylene alpha-olefin in the ethylene homopolymer or copolymer used in the process according to the disclosure preferably is at most 10 mole %, preferably at most 5 mole %, more preferably at most 1 mole %. If a non-ethylene alpha-olefin is used, it is generally present in an amount of at least 0.001 mole %, in particular at least 0.01 mole %, still more in particular at least 0.1 mole %. The use of a material which is substantially free from non-ethylene alpha-olefin is preferred. Within the context of the present specification, "substantially free from non-ethylene alpha-olefin" is intended to mean that the only amount of non-ethylene alpha-olefin present in the polymer is that which cannot reasonably be avoided.

In general, the UHMWPE tapes, in particular those with a narrow molecular weight distribution, have a polymer solvent content of less than 0.05 wt. %, in particular less than 0.025 wt. %, more in particular less than 0.01 wt. %.

In one embodiment, the tapes used in the present disclosure, in particular UHMWPE tapes have a high strength in combination with a high linear density. In the present application the linear density is expressed in dtex. This is the weight in grams of 10,000 meters of film. In one embodiment, the film according to the disclosure has a denier of at least 500 dtex, in particular at least 100 dtex, more in particular at least 3000 dtex, even more in particular at least 5000 dtex, more in particular at least 10000 dtex, even more in particular at least 15000 dtex, or even at least 20000 dtex, in combination with strengths of at least 1.0 GPa, in particular at least 1.5 GPa, more in particular at least 2.0 GPa, still more in particular at least 2.5 GPA, more in particular at least 3.0 GPa, still more in particular at least 3.5 GPa, and even more in particular at least 4 GPa.

In one embodiment of the present disclosure, the polyethylene tapes are tapes manufactured by a process which comprises subjecting a starting polyethylene with a weight average molecular weight of at least 100 000 gram/mole, an elastic shear modulus $G_N^0$, determined directly after melting at 160° C. of at most 1.4 MPa to a compacting step and a stretching step under such conditions that at no point during the processing of the polymer its temperature is raised to a value above its melting point.

The starting material for said manufacturing process is a highly disentangled UHMWPE. This can be seen from the combination of the weight average molecular weight and the elastic modulus. For further elucidation. As indicated above, the starting polymer has an elastic shear modulus $G_N^0$ determined directly after melting at 160° C. of at most 1.4 MPa, more in particular at most 1.0 MPa, still more in particular at most 0.9 MPa, even more in particular at most 0.8 MPa, and even more in particular at most 0.7. The wording "directly after melting" means that the elastic modulus is determined as soon as the polymer has melted, in particular within 15 seconds after the polymer has melted. For this polymer melt, the elastic modulus typically increases from 0.6 to 2.0 MPa in several hours.

The elastic shear modulus directly after melting at 160° C. is a measure for the degree of entangledness of the polymer. $G_N^0$ is the elastic shear modulus in the rubbery plateau region. It is related to the average molecular weight between entanglements Me, which in turn is inversely proportional to the entanglement density. In a thermodynamically stable melt having a homogeneous distribution of entanglements, Me can be calculated from $G_N^0$ via the formula $G_N^0 = g_N \rho RT/M_e$, where $g_N$ is a numerical factor set at 1, rho is the density in g/cm3, R is the gas constant and T is the absolute temperature in K. A low elastic modulus thus stands for long stretches of polymer between entanglements, and thus for a low degree of entanglement. The adopted method for the investigation on changes in with the entanglements formation is the same as described in publications (Rastogi, S., Lippits, D., Peters, G., Graf, R., Yefeng, Y. and Spiess, H., "Heterogeneity in Polymer Melts from Melting of Polymer Crystals", Nature Materials, 4(8), 1 Aug. 2005, 635-641 and PhD thesis Lippits, D. R., "Controlling the melting kinetics of polymers; a route to a new melt state", Eindhoven University of Technology, dated 6 Mar. 2007, ISBN 978-90-386-0895-2).

The disentangled polyethylene for use in this embodiment may be manufactured by a polymerisation process wherein ethylene, optionally in the presence of other monomers as discussed above, is polymerised in the presence of a single-site polymerisation catalyst at a temperature below the crystallisation temperature of the polymer, so that the polymer crystallises immediately upon formation. Suitable methods for manufacturing polyethylenes used in the present disclosure are known in the art. Reference is made, for example, to WO001/21668 and US20060142521.

The UHMWPE tapes which may be used in the present disclosure may be manufactured by solid state processing of the UHMWPE, which process comprises compacting UHMWPE powder, and stretching the resulting compacted sheets to form tapes. Suitable methods for solid state processing UHMWPE are known in the art, and described, e.g., in WO2009/109632, WO2009/153318 and WO2010/079172 and require no further elucidation here.

The present disclosure is illustrated by the following examples, without being limited thereto or thereby.

EXAMPLE 1

Helmet

A ballistic material according to the disclosure was manufactured as follows. The starting material consisted of UHMW Polyethylene tapes having a tensile strength of 2.04+/−0.17 GPa, and a tensile modulus of 169.0+/−10.2 GPa. The polyethylene had a weight average molecular weight Mw of 11.4 g/mol, and an Mw/Mn of 28.

Sheets were manufactured by aligning tapes parallel to each other to form a first layer, aligning a further layer of tapes onto the first layer parallel and offset to the tapes in the first layer, with a matrix being present between the first layer and the second layer. The layers were heat-pressed for consolidation. This configuration will also be indicated as a "brick" sheet. Two types of matrix materials were used to bind the tapes, namely a HDPE matrix, applied in an average amount of 5.5 g/m², and a thermoplastic elastomer SIS-block copolymer matrix, applied in an average amount of 2.0+/−0.25 g/m². The HDPE matrix was applied in the form of a commercially (Sokufol folien GmbH) available film with a specified density of 0.957 g/cm³, a width of 550 mm, and a thickness of 0.006 mm. The SIS-block copolymer was applied in the form of a commercially available aqueous dispersion (based on Kraton D1161). The brick sheets were cross-plied with the tapes in the first brick being at a 90° angle to the tapes in the adjacent bricks. Helmet shells were obtained comprising a first layer comprising tapes and HDPE as matrix, and a second layer comprising tapes and thermoplastic elastomer as matrix. The HDPE-based layer comprised 10 HDPE-based brick layers (5 crossplies), and was positioned at the back face of the helmet, closest to the head. The elastomer-based layer comprised 70 elastomer-based bricks (35 crossplies), and was present at the strike face of the helmet.

The crossplies were cut to form a pattern with four incisions. The crossplies were stacked so that there was a homogeneous distribution of incisions, with a small rotation angle between the successive layers (analogous to the helmet described in WO2013/124233, Concept A, p. 26).

The helmet shells were compressed at a pressure of 55 bar, for at least 30 minutes at a helmet core temperature of above 129° C. (mold temperature 132° C.). Then, the article was cooled down to room temperature, while maintaining pressure.

The resulting helmet shell, indicated in table 1 as Example 1, had the following composition:

A first layer at the strike face of the helmet, making up 87.5 wt. % of the helmet, comprising 4 wt. % of SIS thermoplastic elastomer matrix.

A second layer at the back face of the helmet, making up 12.5 wt. % of the helmet, comprising 10 wt. % of HDPE matrix. The helmet had a total areal mass of 7.73 kg/m2.

A comparative ballistic material A was manufactured analogous to what is described above, except that instead of a HDPE-based layer a further layer comprising the thermoplastic elastomer as matrix was applied. The resulting helmet shell, indicated in table 1 as Comparative A, comprised 40 cross-plies having SIS matrix (and no layers with HDPE as matrix). The helmet had an areal mass of 7.71 kg/m2.

The ballistic performance of both helmet shells was evaluated in accordance with STANAG 2920, using the 1.1 g Fragment Simulating Projectile FSP.

The ballistic performance is expressed by the specific energy absorption (SEA$_{50}$), which is defined by $$0.5 \times M_{projectile} \times V_{50}^2)/AW$$

In which $M_{projectile}$ is the mass of the projectile in kilogram and $V_{50}$ is the determined velocity in meter per second where the perforation probability of the respective projectiles is 50%. The areal weight AW is expressed in kilogram per square meter. The Dynamic trauma is measured in plasticine witness-backing. The results are presented in Table 1.

TABLE 1

|  | SEA$_{50}$ 1.1 g FSP J/(kg/m$^2$) | Dynamic Trauma mm |
|---|---|---|
| Example 1 | 37.4 | 21 |
| Comparative A | 37.2 | 21 |

As can be seen from Table 1, the helmet shell according to the disclosure and the comparative helmet shell showed about equal SEA and dynamic trauma. However, from visual inspection it appeared that the comparative helmet showed substantial release of fibrils, while the helmet according to the disclosure showed hardly any fibril release. Further, the comparative helmet shell shows more backface deformation than the helmet according to the disclosure. This shows that the present disclosure makes it possible to obtain a product with better structural integrity while at least retaining ballistic performance.

The performance of helmet shells as described above against impact of 9 mm DM41 hand gun ammunition was tested as follows.

The helmet was fixed into a frame, in accordance with "TR-Polizei 2003", and shots were fired at the front side and back side of the helmet and the left and right flanks, all within the velocity range of 405 to 425 m/s. Trauma was determined using a plasticine backing inside the helmet. Back face deformation and fibrillation were quantified as indicated above. Trauma data are presented in Table 2.

TABLE 2

|  | Trauma 9 mm DM41 mm |
|---|---|
| Example 1 | 47 ± 3 |
| Comparative A | 55 ± 5 |

From visual inspection it appeared that the comparative helmet showed substantial release of fibrils, and even loosening of complete inner layers. In contrast, the helmet according to the disclosure showed hardly any fibril release, and no layer release took place. Further, the comparative helmet shell shows more back-face deformation than the helmet according to the disclosure.

In combination with the trauma data in Table 2, this shows that the present disclosure makes it possible to obtain a product with better structural integrity. Ballistic performance is the same.

The invention claimed is:

1. A ballistic-resistant molded article comprising:
   a compressed stack of a plurality of sheets comprising reinforcing tapes having a tensile strength of at least 1.0 GPa, a tensile modulus of at least 40 GPa, and a tensile energy-to-break of at least 15 J/g, the reinforcing tapes having an orientation direction within the compressed stack that is not unidirectional, wherein the stack comprises:
   at least one HDPE-based layer comprising:
      a high-density polyethylene as a matrix material and at least one of the plurality of sheets comprising the reinforcing tapes,
      wherein the matrix is at least 60 wt. % HDPE, and
   at least one elastomer-based layer comprising:
      a thermoplastic elastomer as a matrix material and another one of the plurality of sheets comprising the reinforcing tapes,
      wherein the thermoplastic elastomer matrix material of the at least one elastomer-based layer makes up 0.2-8 wt. % of the at least one elastomer-based layer, and
      the matrix is at least 60 wt. % elastomer.

2. The ballistic-resistant molded article according to claim 1, wherein the high-density polyethylene matrix material of the at least one HDPE-based layer makes up between 0.2 and 20 wt. % of the at least one HDPE-based layer.

3. The ballistic-resistant molded article according to claim 1, wherein the high-density polyethylene matrix material has a density, measured in accordance with ASTM D792, in a range of 0.930 to 0.970 g/cm$^3$.

4. The ballistic-resistant molded article according to claim 1, wherein the high-density polyethylene matrix material of the at least one HDPE-based layer has a molecular weight in a range of $1 \cdot 10^4$ to $1 \cdot 10^8$ g/mol.

5. The ballistic-resistant molded article according to claim 1, wherein the at least one HDPE-based layer is at or near a back face of the article, wherein the back face is opposite a strike face of the article from which an impact is expected.

6. The ballistic-resistant molded article according to claim 1, wherein the at least one HDPE-based layer is at or near a strike face of the article from which an impact is expected.

7. The ballistic-resistant molded article according to claim 1, comprising more than one of the at least one HDPE-based layer, wherein at least one of the more than one HDPE-based layers is at or near a strike face of the article, and at least one other one of the more than one HDPE-based layers is at or near a back face of the article, wherein the back face is the face opposite the strike face of the article from which an impact is expected.

8. The ballistic-resistant molded article according to claim 1, wherein 2-70 wt. % of the article is made up of the at least one HDPE-based layer, calculated on a total weight of the high-density polyethylene matrix material, the thermoplastic elastomer matrix material and the reinforcing tapes in the article.

9. The ballistic-resistant molded article according to claim 1, wherein the reinforcing tapes of the compressed stack are ultra-high molecular weight polyethylene tapes.

10. The ballistic-resistant molded article according to claim 1, which is substantially flat, single-curved, double curved, or multicurved.

11. The ballistic-resistant molded article according to claim 10, which is a panel, shield or helmet.

* * * * *